United States Patent
Tomita et al.

(10) Patent No.: US 9,333,912 B2
(45) Date of Patent: May 10, 2016

(54) ONBOARD APPARATUS AND REPORT CONTROL METHOD

(71) Applicants: Yosuke Tomita, Aichi (JP); Koji Takizawa, Kyoto (JP); Yoshie Naruse, Aichi (JP)

(72) Inventors: Yosuke Tomita, Aichi (JP); Koji Takizawa, Kyoto (JP); Yoshie Naruse, Aichi (JP)

(73) Assignee: OMRON AUTOMOTIVE ELECTRONICS CO., LTD., Aichi (JP)

(*) Notice: Subject to any disclaimer, the term of this patent is extended or adjusted under 35 U.S.C. 154(b) by 0 days.

(21) Appl. No.: 14/471,894

(22) Filed: Aug. 28, 2014

(65) Prior Publication Data

US 2015/0061851 A1 Mar. 5, 2015

(30) Foreign Application Priority Data

Aug. 28, 2013 (JP) ................. 2013-176210

(51) Int. Cl.
| | |
|---|---|
| *B60Q 1/00* | (2006.01) |
| *B60Q 9/00* | (2006.01) |
| *G07C 5/00* | (2006.01) |
| *G08B 25/00* | (2006.01) |
| *G08B 25/01* | (2006.01) |
| *G08G 1/00* | (2006.01) |

(52) U.S. Cl.
CPC ............... *B60Q 9/008* (2013.01); *G07C 5/008* (2013.01); *G08B 25/006* (2013.01); *G08B 25/016* (2013.01); *G08G 1/205* (2013.01); *G07C 2205/02* (2013.01)

(58) Field of Classification Search
CPC .............. G08B 25/016; G08B 25/006; G06K 9/00832; G07C 5/008; G08G 1/205; B60Q 9/008

USPC .................... 340/436, 426.1, 426.18–426.21, 340/426.24, 426.25, 426.27, 429, 539.18; 701/45

See application file for complete search history.

(56) References Cited

U.S. PATENT DOCUMENTS

| | | | | |
|---|---|---|---|---|
| 7,181,192 | B2 * | 2/2007 | Panasik ............. | H04M 1/72538 340/436 |
| 2007/0194893 | A1* | 8/2007 | Deyoe ............... | H04M 1/72538 340/436 |
| 2009/0261958 | A1* | 10/2009 | Sundararajan ...... | H04W 76/007 340/436 |
| 2014/0335816 | A1* | 11/2014 | Long ................. | H04M 1/72541 455/406 |

FOREIGN PATENT DOCUMENTS

| | | |
|---|---|---|
| JP | H11-355478 A | 12/1999 |
| JP | 2006-023862 A | 1/2006 |
| JP | 2011-144624 A | 7/2011 |

* cited by examiner

*Primary Examiner* — Thomas Mullen
(74) *Attorney, Agent, or Firm* — Osha Liang LLP

(57) ABSTRACT

An automatic report to an appropriate destination can be sent in a short time when abnormality is detected with a vehicle. When the shock is determined to occur with the vehicle in step S1, inside/outside determination of a portable device for a vehicle is performed in step S2. In a case where the portable device is determined to be in the vehicle in step S3, an emergency organization is selected as a reporting destination in step S4, and in a case where the portable device is determined to be outside of the vehicle, a user's portable telephone device is selected as a reporting destination in step S5. Then, in step S6, a report is sent to the selected reporting destination. The present invention can be applied to, for example, an onboard apparatus for performing automatic report when abnormality occurs with the vehicle.

16 Claims, 8 Drawing Sheets

ONBOARD APPARATUS AND REPORT CONTROL METHOD

BACKGROUND OF THE INVENTION

1. Technical Field

The present invention relates to an onboard apparatus and a report control method, and more particularly, to an onboard apparatus and a report control method for performing automatic report when abnormality is detected with a vehicle.

2. Related Art

In the past, a vehicle danger reporting apparatus has been suggested. When abnormality is detected with a vehicle, the vehicle danger reporting apparatus notifies a passenger of occurrence of abnormality and a coping method, automatically reports to a predetermined reporting destination by means of an onboard telephone apparatus and the like, sends a notification to a vehicle therearound by means of inter-vehicle communication and the like, and carries out coping treatment to cope with the abnormality. (for example, see Japanese Unexamined Patent Publication No. 2006-23862). Japanese Unexamined Patent Publication No. 2006-23862 indicates embodiments of five vehicle danger reporting apparatuses each for different detection targets (for example, vehicle fire and submersion), but each vehicle danger reporting apparatus has a fixed emergency reporting destination for the time when abnormality is detected.

In contrast, in the past, a technique for an automatic reporting destination according to the state of a passenger has been suggested (for example, see Japanese Unexamined Patent Publication No. H11-355478). More specifically, when an accident is detected or when an emergency switch is pressed down, a passenger is asked a question, and the state of the passenger is estimated on the basis of the answer to the question, and an automatic reporting destination is selected on the basis of the estimation result.

Further, in the past, it is suggested to cause a vehicle Key FOB to calculate magnetic field strengths of a radio wave at antennas of the driver's seat side and the passenger's seat side of the vehicle, and notify the result to the vehicle, and cause the vehicle to determine the position of the Key FOB on the basis of the difference of the magnetic field strengths. (for example, see Japanese Unexamined Patent Publication No. 2011-144624).

However, in the invention described in Japanese Unexamined Patent Publication No. H11-355478, the automatic report is delayed as much as the time required for the passenger to answer to the question. Moreover, when the answer of the passenger or the result of the voice recognition is incorrect, an automatic report may be sent to an inappropriate reporting destination.

Therefore, embodiments of the present invention enable automatic report to an appropriate destination in a short time when abnormality is detected with a vehicle.

SUMMARY

An onboard apparatus in accordance with one or more embodiments of the present invention is an onboard apparatus configured to perform automatic report when abnormality is detected with a vehicle, and the onboard apparatus includes a shock detection unit configured to detect shock with the vehicle, an inside/outside determination unit configured to perform inside/outside determination as to whether a portable device for the vehicle is inside of the vehicle or outside of the vehicle, a reporting destination selection unit configured to select a reporting destination on the basis of a determination result of the inside/outside determination, and a reporting unit configured to report to the selected reporting destination in a case where shock is detected with the vehicle.

The onboard apparatus in accordance with one or more embodiments of the present invention may be configured such that, when the shock is detected with the vehicle, inside/outside determination is performed to determine whether the portable device for the vehicle is inside of the vehicle or outside of the vehicle, and on the basis of the determination result of the inside/outside determination, the reporting destination is selected, and when the shock is detected with the vehicle, the report to the selected reporting destination is performed.

Therefore, when abnormality is detected with the vehicle, the automatic report to an appropriate reporting destination can be sent in a short time.

The shock detection unit, the inside/outside determination unit, the reporting destination selection unit, and the reporting unit are achieved with, for example, an ECU (Electronic Control Unit). This portable device is achieved with, for example, a Key FOB for a vehicle.

The determination result of the inside/outside determination is determined to be inside of the vehicle, the reporting destination selection unit may select a predetermined emergency organization as the reporting destination, and when the determination result of the inside/outside determination is determined to be outside of the vehicle, a user's communication terminal may be selected as the reporting destination.

Therefore, when the user is in the vehicle, the automatic report is sent to the emergency organization. When the user is not inside of the vehicle, the automatic report is sent to the user.

The shock detection unit further determines the magnitude of the shock with the vehicle, and when the shock with the vehicle is determined to be large and the determination result of the inside/outside determination is determined to be outside of the vehicle, then the reporting destination selection unit selects not only the communication terminal but also the emergency organization as the reporting destination.

Therefore, even when the user is not inside of the vehicle, the automatic report can be sent to not only the user but also the emergency organization when the shock is large.

In a case where at least one of activation of an airbag of the vehicle and breaking of a windowpane of the vehicle occurs, the shock detection unit may determine that the shock occurs with the vehicle, and in a case where the airbag is activated, the shock detection unit may determine that the shock with the vehicle is large, and in a case where the airbag is not activated, the shock detection unit may determine that the shock with the vehicle is small.

Therefore, when the user is not in the vehicle, and abnormality of which situation needs to be confirmed immediately occurs such as an accident in which an airbag is activated, then the automatic report can be sent to the user and the emergency organization, and in other cases, the automatic report can be sent to the user.

In a case where the determination result of the inside/outside determination is determined to be outside of the vehicle, the reporting destination selection unit does not select the reporting destination, and in a case where the shock is detected with the vehicle and the reporting destination is not selected, the reporting unit does not report.

Therefore, when the user is not in the vehicle, the automatic report can be prevented from being performed.

In a case where the shock is detected with the vehicle, the inside/outside determination unit performs the inside/outside determination, and the reporting destination selection unit selects the reporting destination on the basis of the determination result of the inside/outside determination.

Therefore, the accuracy of the inside/outside determination is high, and the reporting destination can be selected more appropriately.

The onboard apparatus further includes a communication unit configured to perform wireless communication with the portable device, and a storage unit configured to store the determination result of the inside/outside determination, wherein the inside/outside determination unit performs the inside/outside determination on the basis of the state of the wireless communication that is performed with predetermined timing between the communication unit and the portable device, and stores the determination result of the inside/outside determination to the storage unit, and the reporting destination selection unit selects the reporting destination on the basis of the determination result of the latest inside/outside determination stored in the storage unit when the shock is detected with the vehicle.

Therefore, when abnormality is detected with a vehicle, the automatic report is performed in a shorter time.

This communication unit is achieved with, for example, an ECU (Electronic Control Unit). This storage unit is achieved with, a storage medium such as a RAM.

A report control method in accordance with one or more embodiments of the present invention is a report control method used when abnormality is detected with a vehicle, and the report control method includes a shock detection step for detecting shock with the vehicle, an inside/outside determination step for performing inside/outside determination as to whether a portable device for the vehicle is inside of the vehicle or outside of the vehicle, a reporting destination selection step for selecting a reporting destination on the basis of a determination result of the inside/outside determination, and a reporting step for reporting to the selected reporting destination in a case where shock is detected with the vehicle.

The report control method in accordance with one or more embodiments of the present invention may be configured such that, when the shock is detected with the vehicle, inside/outside determination is performed to determine whether the portable device for the vehicle is inside of the vehicle or outside of the vehicle, and on the basis of the determination result of the inside/outside determination, the reporting destination is selected, and when the shock is detected with the vehicle, the report to the selected reporting destination is performed.

Therefore, when abnormality is detected with a vehicle, the automatic report to an appropriate reporting destination can be sent in a short time.

Each step is executed by, for example, an ECU (Electronic Control Unit). This portable device is achieved with, for example, a Key FOB for a vehicle.

In accordance with one or more embodiments of the present invention, the automatic report to an appropriate destination can be performed in a short time when abnormality is detected with a vehicle.

DETAILED DESCRIPTION

Embodiments for carrying out the present invention will be hereinafter explained.

First, one or more embodiments of the present invention will be explained with reference to FIGS. 1 to 5.

[Example of Configuration of Report System 1]

Figure 1:
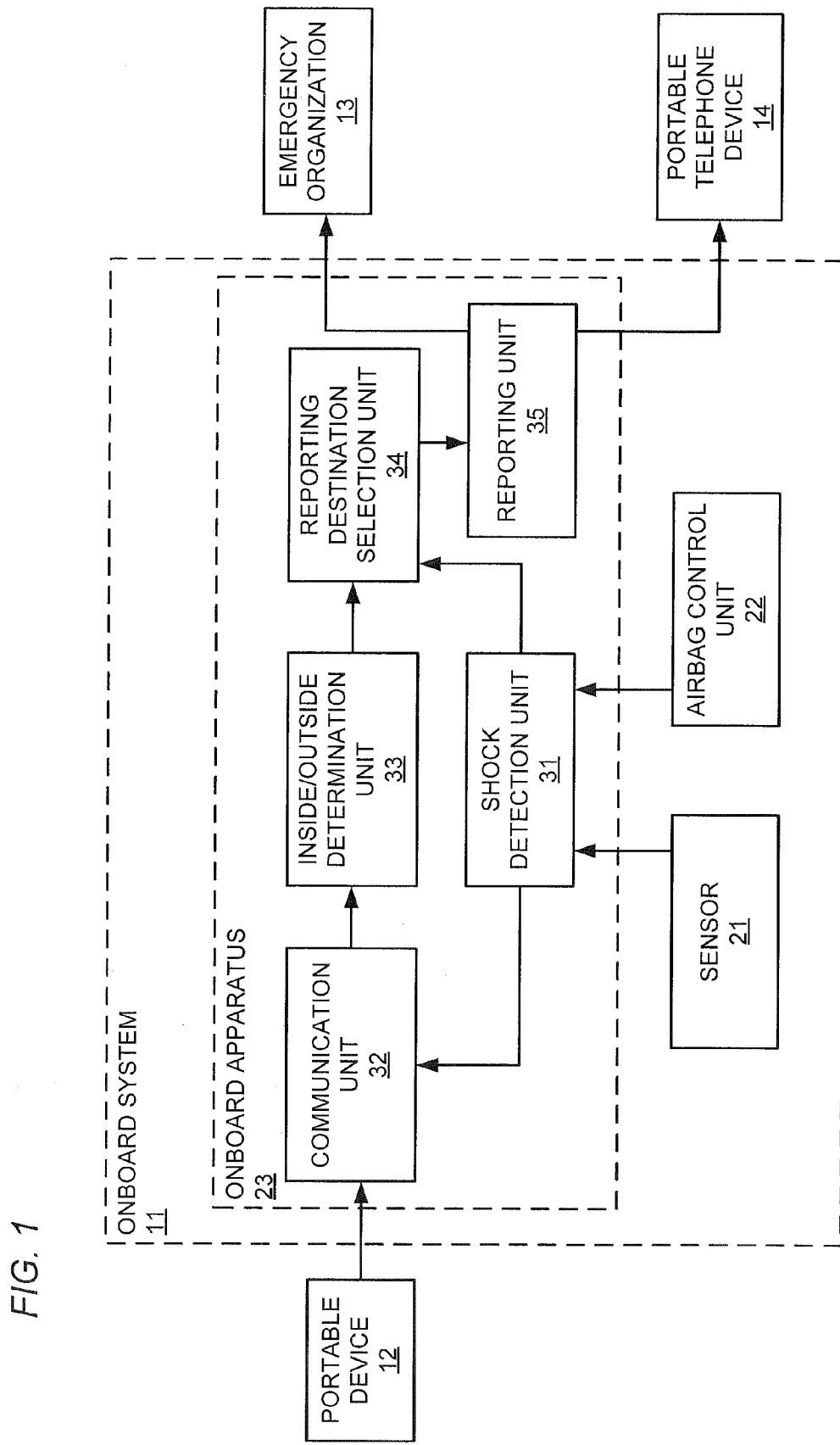
FIG. 1 is a block diagram illustrating an onboard system to which the present invention is applied according to one or more embodiments.

FIG. 1 is a block diagram illustrating a configuration of an onboard system 11 which is one or more embodiments of the onboard system to which the present invention is applied.

The onboard system 11 is configured to include a sensor 21, an airbag control unit 22, and an onboard apparatus 23. It should be noted that the onboard system 11 can be applied to any given type of vehicle.

The sensor 21 is, for example, a sensor for obtaining data for detection of breaking of a window of the vehicle, and provides the obtained data to a shock detection unit 31 of the onboard apparatus 23.

It should be noted that when the data obtained by the sensor 21 may be any given type of data as long as breaking of a window of the vehicle can be detected by the data. The data may be, for example, data indicating the intensity of a shock given to the window of the vehicle, an air pressure in the vehicle, and movement of air in the vehicle, or may be image data obtained by capturing an image of a window.

The airbag control unit 22 controls operation of an airbag of the vehicle. The airbag control unit 22 provides the control signal indicating the state of the airbag of the vehicle to the shock detection unit 31 of the onboard apparatus 23.

The onboard apparatus 23 is achieved with, for example, an ECU (Electronic Control Unit), and is an apparatus for detecting occurrence of abnormality of the vehicle, and making automatic report. The onboard apparatus 23 is configured to include a shock detection unit 31, a communication unit 32, an inside/outside determination unit 33, a reporting destination selection unit 34, and a reporting unit 35.

The shock detection unit 31 detects whether the windowpane of the vehicle is broken or not on the basis of data given by the sensor 21. The shock detection unit 31 detects whether the airbag is activated or not (whether the airbag is inflated or not) on the basis of the control signal given by the airbag control unit 22. Then, the shock detection unit 31 detects whether a shock occurs with the vehicle or not, and determines the magnitude of the shock, on the basis of these two detection results. The shock detection unit 31 notifies a detection result indicating whether a shock occurs with the vehicle or not to the communication unit 32. The shock detection unit 31 notifies the determination result of the magnitude of the shock of the vehicle to the reporting destination selection unit 34.

The communication unit 32 includes, for example, one or more antennas, a communication apparatus, and the like, provided in the vehicle. Antennas may be provided outside of the communication unit 32 (onboard apparatus 23). When the shock detection unit 31 detects occurrence of shock of the vehicle, the communication unit 32 performs wireless communication with the portable device 12 in accordance with a predetermined method, and provides information indicating the communication state (including a signal received from the portable device 12) to the inside/outside determination unit 33.

It should be noted that the portable device 12 is, for example, a Key FOB for the vehicle and the like. The portable device 12 is used for, e.g., remote operation for locking and unlocking doors of the vehicle, and authentication for permission of supply of electric power and starting of a prime mover (for example, engine or motor) of the vehicle. Any method can be employed as a communication method between the communication unit 32 and the portable device 12. For example, wireless communication such as LF band and UHF band and short-distance wireless communication such as Bluetooth (registered trademark) are employed.

The inside/outside determination unit 33 performs inside/outside determination for determining whether the portable device 12 is in the vehicle or outside of the vehicle, on the basis of the state of the wireless communication between the communication unit 32 and the portable device 12, and notifies the determination result to the reporting destination selection unit 34.

In the inside/outside determination, any method may be employed. For example, the inside/outside determination is performed in accordance with a publicly-known method on the basis of information as to whether communication can be performed between the communication unit 32 and the portable device 12, reception strengths at the communication unit 32 or the portable device 12, and the position of the antenna with which the communication unit 32 communicates with the portable device 12.

The inside/outside determination unit 33 may determine that the portable device 12 is outside of the vehicle not only in a case where the position of the portable device 12 is successfully detected and the position is outside of the vehicle but also in a case where the position of the portable device 12 cannot be detected in the vehicle due to failure of communication with, e.g., the portable device 12.

The reporting destination selection unit 34 selects a reporting destination for the automatic report from among multiple reporting destinations registered in advance on the basis of the result of the inside/outside determination of the portable device 12. Alternatively, the reporting destination selection unit 34 selects a reporting destination for the automatic report not only on the basis of the determination result of the inside/outside determination of the portable device 12 but also on the basis of the determination result of the magnitude of the shock of the vehicle. Then, the reporting destination selection unit 34 notifies the reporting unit 35 of the selected reporting destination.

It should be noted that the reporting destination for the automatic report is considered to be, for example, an emergency organization 13 and a portable telephone device 14 as shown in the drawing. The emergency organization 13 is considered to be, for example, a dedicated call center to which abnormality of a vehicle is reported, police, fire station, and the like. The portable telephone device 14 may be, for example, a portable telephone device (including a smartphone, a PHS (Personal Handy-phone System), and the like) that is owned by a user and that can be used as contacting information of the user (the owner of the vehicle).

The reporting unit 35 automatically reporting occurrence of abnormality of the vehicle to the reporting destination selected by the reporting destination selection unit 34 (at least one of the emergency organization 13 and the portable telephone device 14). The communication method with the reporting destination may be any method as long as it is a method capable of immediately transmitting information to the reporting destination, such as voice communication and e-mail.

It should be noted that the communication method between the reporting unit 35 and the emergency organization 13 may be, for example, mobile communication via mobile communication network (for example, portable telephone network and the like) such as a portable telephone, a satellite telephone, and a PHS, and communication via a network (the Internet and the like) by way of a wireless router using WiFi and the like.

[Processing of the Onboard System 11]

Subsequently, the processing of the onboard system 11 will be explained with reference to FIGS. 2 to 5.

(One or More Embodiments of Automatic Report Processing that is Performed by the Onboard System 11)

First, one or more embodiments of the automatic report processing executed by the onboard system 11 will be explained with reference to the flowchart of FIG. 2.

In step S1, the shock detection unit 31 determines whether the shock occurs with the vehicle or not on the basis of the control signal given by the airbag control unit 22 and the data given by the sensor 21. This determination processing is repeatedly executed until the shock is determined to have occurred with the vehicle. Then, when the shock detection unit 31 detects breaking of a windowpane of the vehicle on the basis of the data given by the sensor 21, or when the shock detection unit 31 detects activation of an airbag of the vehicle on the basis of the control signal given by the airbag control unit 22, the shock detection unit 31 detects occurrence of the shock with the vehicle. Then, the shock detection unit 31 notifies the communication unit 32 of occurrence of the shock with the vehicle. Thereafter, the processing proceeds to step S2.

In step S2, the onboard apparatus 23 performs the inside/outside determination of the portable device 12. More specifically, the communication unit 32 tries wireless communication with the portable device 12, and provides information indicating the communication state (including a signal received from the portable device 12) to the inside/outside determination unit 33. The inside/outside determination unit 33 performs the inside/outside determination of the portable device 12 on the basis of the communication state between the communication unit 32 and the portable device 12, and notifies the reporting destination selection unit 34 of the determination result.

In step S3, the reporting destination selection unit 34 determines whether the portable device 12 is in the vehicle or not on the basis of the determination result notified by the inside/outside determination unit 33. When the portable device 12 is determined to be in the vehicle, the processing proceeds to step S4.

In step S4, the reporting destination selection unit 34 selects the emergency organization 13 as the reporting destination. Then, the reporting destination selection unit 34 notifies the reporting unit 35 that the emergency organization 13 is selected as the reporting destination.

Thereafter, the processing proceeds to step S6.

On the other hand, when the portable device 12 is determined to be outside of the vehicle in step S3, the processing proceeds to step S5.

In step S5, the reporting destination selection unit 34 selects the user's portable telephone device 14 as the reporting destination. Then, the reporting destination selection unit 34 notifies the reporting unit 35 that the portable telephone device 14 is selected as the reporting destination.

Thereafter, the processing proceeds to step S6.

In step S6, the reporting unit 35 reports to the reporting destination selected by the reporting destination selection unit 34.

Thereafter, back to step S1, the processing in step S1 and subsequent steps are executed.

When the onboard system 11 (onboard apparatus 23) is provided in a vehicle 51 as described above, for example, as shown in FIG. 3, then, a shock with the vehicle 51 is detected, and when the portable device 12 is determined to be inside of the vehicle 51 through the inside/outside determination, a report to the emergency organization 13 is automatically sent.

For example, when the portable device 12 is inside of the vehicle 51, it is highly likely that the user may also be inside of the vehicle 51. When shock occurs to such degree that the airbag is activated, the accident is highly likely to have occurred, and even when shock occurs to such degree that the airbag is not activated but the windowpane is broken, robbery or assault case which may harm the user may be happening. In any case, the user (passenger) is in a dangerous state, and a situation where the user may be in panic and is unable to report is predicted. Therefore, the automatic report to the emergency organization 13 is sent, so that such emergency situation can be solved quickly and appropriately.

Figure 4:
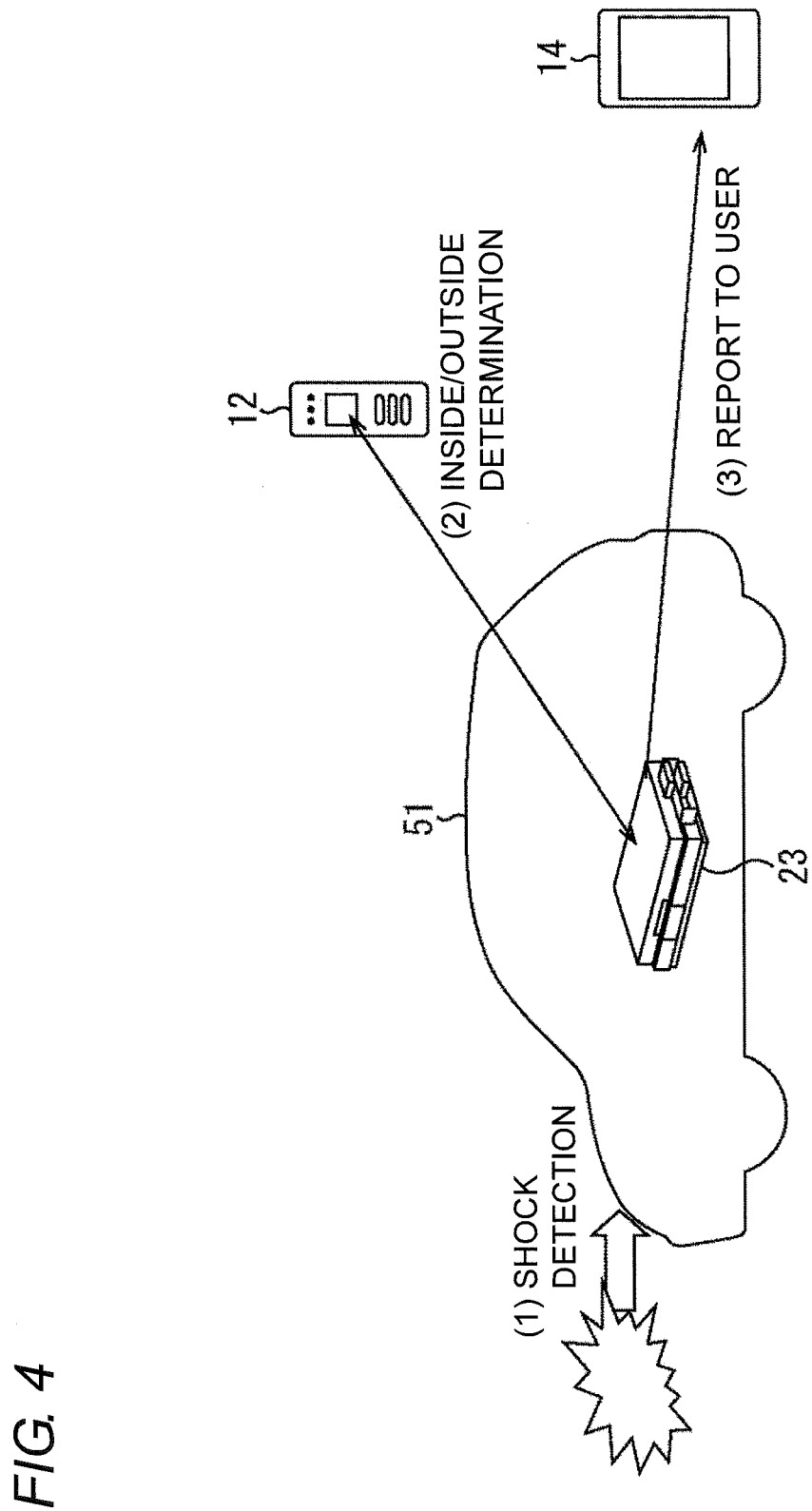
FIG. 4 illustrates a flow of processing in a case where the portable device is outside of the vehicle according to one or more embodiments.

On the other hand, when the shock is detected with the vehicle 51 and the portable device 12 is determined to be outside of the vehicle 51 through the inside/outside determination as shown in FIG. 4, a report to the user's portable telephone device 14 is automatically sent.

For example, when the portable device 12 is determined to be outside of the vehicle 51, it is highly likely that the user who has the portable device 12 is outside of the vehicle 51 and nobody is in the vehicle 51. Therefore, it is likely that abnormality such as an accident, robbery, or theft of goods in the vehicle may be happening, and it is contemplated that the chance of endangering a person is low and the user is able to cope with the situation in a calm manner. Therefore, the automatic report to the user's portable telephone device 14 is sent.

The inside/outside determination is performed after the shock is detected with the vehicle, so that the accuracy of the inside/outside determination can be enhanced, and the reporting destination can be selected appropriately.

(One or More Embodiments of Automatic Report Processing that is Performed by the Onboard System 11)

Subsequently, one or more embodiments of the automatic report processing executed by the onboard system 11 will be explained with reference to the flowchart of FIG. 5.

Figure 2:
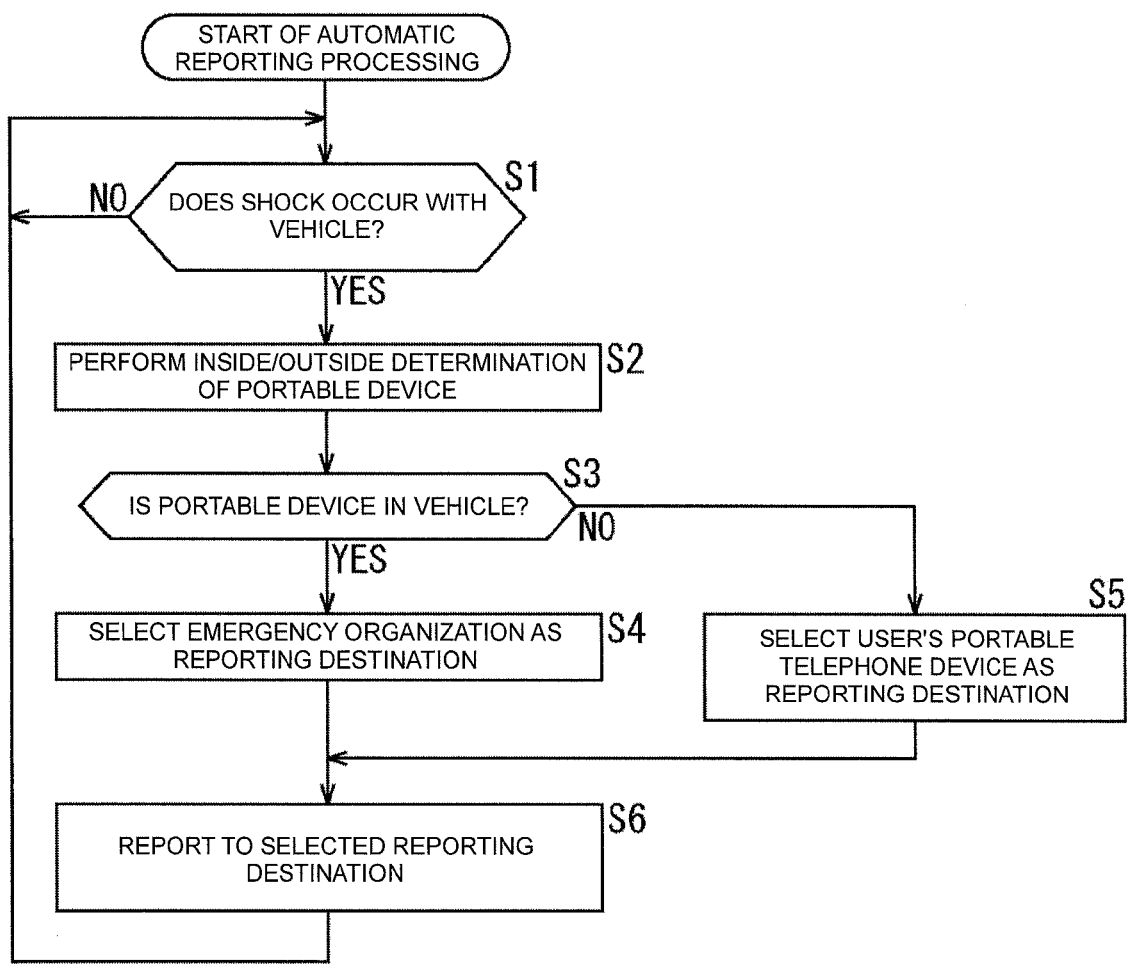
FIG. 2 is a flowchart for explaining automatic report processing that is performed by the onboard system of FIG. 1 according to one or more embodiments.
Figure 3:
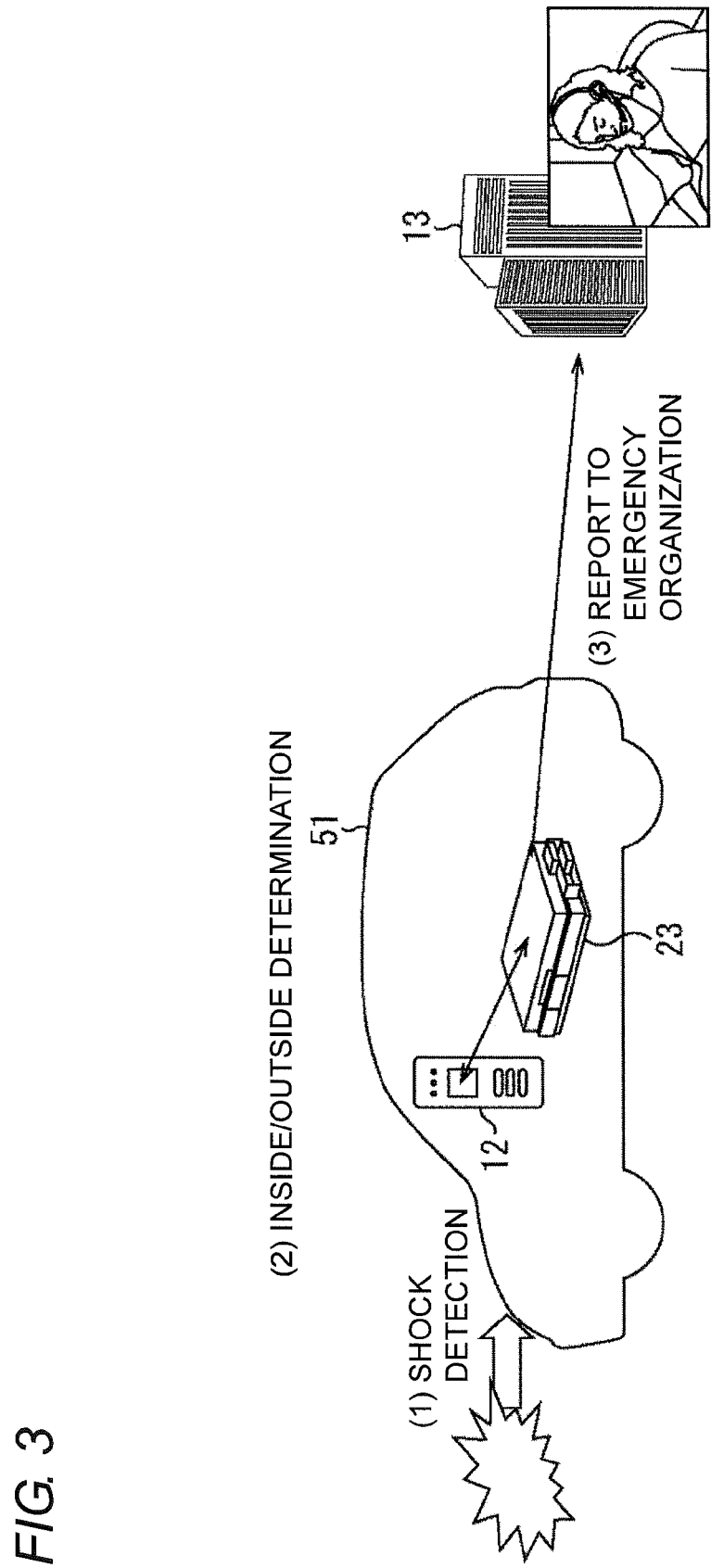
FIG. 3 illustrates a flow of processing in a case where a portable device is in a vehicle according to one or more embodiments.

In steps S51 to S54, the same processing as steps S1 to S4 of FIG. 2 is executed, and the processing proceeds to step S56. Therefore, like the processing of FIG. 2, when the shock is detected with the vehicle, and the portable device 12 is determined to be inside of the vehicle, the emergency organization 13 is selected as the reporting destination.

On the other hand, when the portable device 12 is determined to be outside of the vehicle in step S53, the processing proceeds to step S55.

In step S55, the shock detection unit 31 determines whether the shock is large or not. When the shock detection unit 31 detects activation of the airbag, the shock detection unit 31 determines that the shock is large regardless of whether the window is broken or not. Then the shock detection unit 31 notifies the reporting destination selection unit 34 that large shock occurs with the vehicle, and the processing proceeds to step S56.

In step S56, the reporting destination selection unit 34 selects the emergency organization 13 and the user's portable telephone device 14 as the reporting destination. Then, the reporting destination selection unit 34 notifies the reporting unit 35 that the emergency organization 13 and the portable telephone device 14 are selected as the reporting destination.

Thereafter, the processing proceeds to step S58.

On the other hand, in step S55, the shock detection unit 31 detects that breaking of a windowpane of the vehicle is detected, but activation of an airbag is not detected, the shock detection unit 31 determines that the shock is small. Then, the shock detection unit 31 notifies the reporting destination selection unit 34 that small shock occurs with the vehicle, and the processing proceeds to step S57.

In step S57, the user's portable telephone device 14 is selected as the reporting destination, like the processing in step S5 of FIG. 2.

Thereafter, the processing proceeds to step S58.

In step S58, a report is sent to the selected reporting destination, like the processing in step S6 of FIG. 2.

As described above, when the shock occurs with the vehicle and the portable device 12 is determined to be in the vehicle, the automatic report to the emergency organization 13 is sent, like the processing of FIG. 2. On the other hand, when the portable device 12 is determined to be outside of the vehicle, and the shock is small, the automatic report to the user's portable telephone device 14 is sent, like the processing of FIG. 2. In contrast, when the shock is large, automatic reports to both the emergency organization 13 and the portable telephone device 14 are sent.

This is, as described above, when the portable device 12 is determined to be outside of the vehicle 51, it is contemplated that the user who has the portable device 12 is outside of the vehicle 51, and the user is not endangered, and the user may be able to cope with the situation in a calm manner. However, in a case where shock occurs to such degree that the airbag is activated, for example, it is highly likely that a large scale robbery may be happening, e.g., using a tow car for moving the vehicle, or an accident of collision of the vehicle at a stop with another vehicle may be happening, and it may be necessary to immediately confirm the situation of the scene. In a case where shock occurs to such degree that the airbag is activated, an automatic report is sent to not only the user's portable telephone device 14 but also the emergency organization 13.

Subsequently, one or more embodiments of the present invention will be explained with reference to FIGS. 6 to 8.

[Example of Configuration of Onboard System 101]

Figure 6:
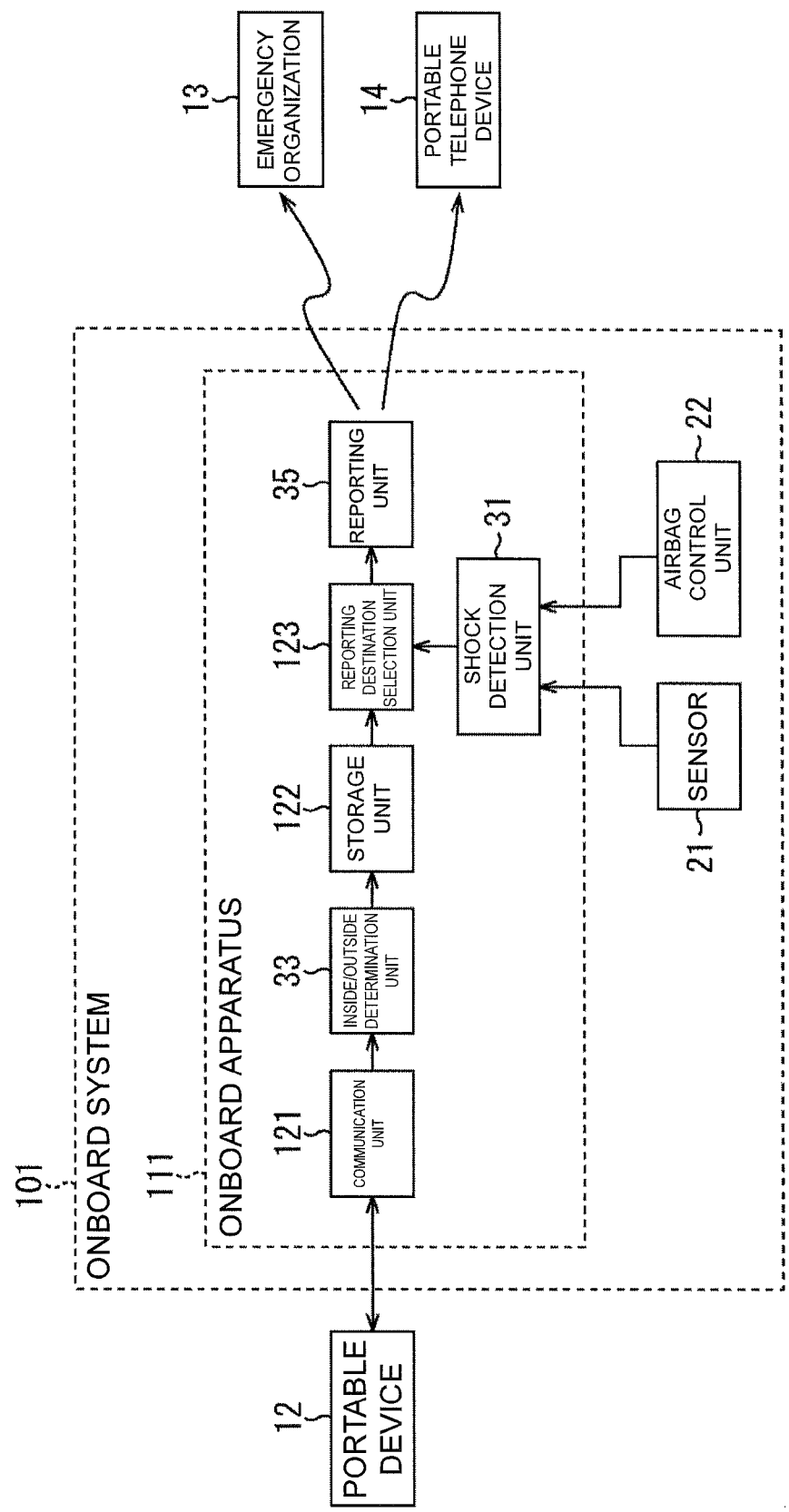
FIG. 6 is a block diagram illustrating an onboard system to which the present invention is applied according to one or more embodiments.

FIG. 6 is a block diagram illustrating the onboard system 101 which is one or more embodiments of the onboard system to which the present invention is applied. In the drawing, portions corresponding to FIG. 1 are denoted with the same reference numerals, and the portions where the processing is the same are omitted as necessary because the explanation thereabout is redundant.

As compared with the onboard system 11 of FIG. 1, the onboard system 101 is different in that an onboard apparatus 111 is provided instead of the onboard apparatus 23. As compared with the onboard apparatus 23 of FIG. 1, the onboard apparatus 111 is different in that a storage unit 122 is added, and that a communication unit 121 and a reporting destination selection unit 123 are provided instead of the communication unit 32 and the reporting destination selection unit 34.

The communication unit 121 is different from the communication unit 32 of the onboard system 11 in that, regardless of the detection result of the shock detection unit 31, wireless communication is performed with the portable device 12 with predetermined timing in accordance with a predetermined method, information indicating the communication state is provided to the inside/outside determination unit 33. For example, the communication unit 121 transmits the polling signal with a regular interval, and in a case where the communication unit 121 receives a response signal from the portable device 12 in reply to the polling signal, the communication unit 121 provides the inside/outside determination unit 33 with the received response signal and information about the position of the antenna with which the polling signal is transmitted.

When information indicating the communication state with the portable device 12 is provided from the communication unit 121, the inside/outside determination unit 33 performs the inside/outside determination of the portable device 12, and stores the determination result to the storage unit 122.

When the shock detection unit 31 detects the shock with the vehicle, the reporting destination selection unit 123 selects the reporting destination in the same processing as that of the reporting destination selection unit 34 of the onboard system 11. The reporting destination selection unit 123 is different from the reporting destination selection unit 34 in that the reporting destination selection unit 123 does not use the determination result of the inside/outside determination directly notified from the inside/outside determination unit 33 but uses the determination result of the latest inside/outside determination stored in the storage unit 122.

Then, the reporting destination selection unit 34 notifies the selected reporting destination to the reporting unit 35.

[Processing of Onboard System 101]

Subsequently, the processing of the onboard system 101 will be explained with reference to FIGS. 7 and 8.

(One or More Embodiments of Automatic Report Processing that is Performed by the Onboard System 101)

First, one or more embodiments of the automatic report processing executed by the onboard system 101 will be explained with reference to the flowchart of FIG. 7.

In step S101, the shock detection unit 31 determines whether the shock occurs with the vehicle or not, like the processing of step S1 of FIG. 2. Then, in a case where the shock detection unit 31 determines that the shock occurs with the vehicle, the shock detection unit 31 notifies the reporting destination selection unit 123 that the shock occurs with the vehicle. Thereafter, the processing proceeds to step S102.

In step S102, the reporting destination selection unit 123 obtains the determination result of the latest inside/outside determination from the storage unit 122.

In step S103, the reporting destination selection unit 123 determines whether the portable device 12 is in the vehicle or not on the basis of the obtained determination result of the latest inside/outside determination. When the portable device 12 is determined to be inside of the vehicle, the processing proceeds to step S104.

In step S104, the emergency organization 13 is selected as the reporting destination, like the processing of step S4 of FIG. 2.

Thereafter, the processing proceeds to step S106.

On the other hand, when the portable device 12 is determined to be outside of the vehicle in step S103, the processing proceeds to step S105.

Figure 7:
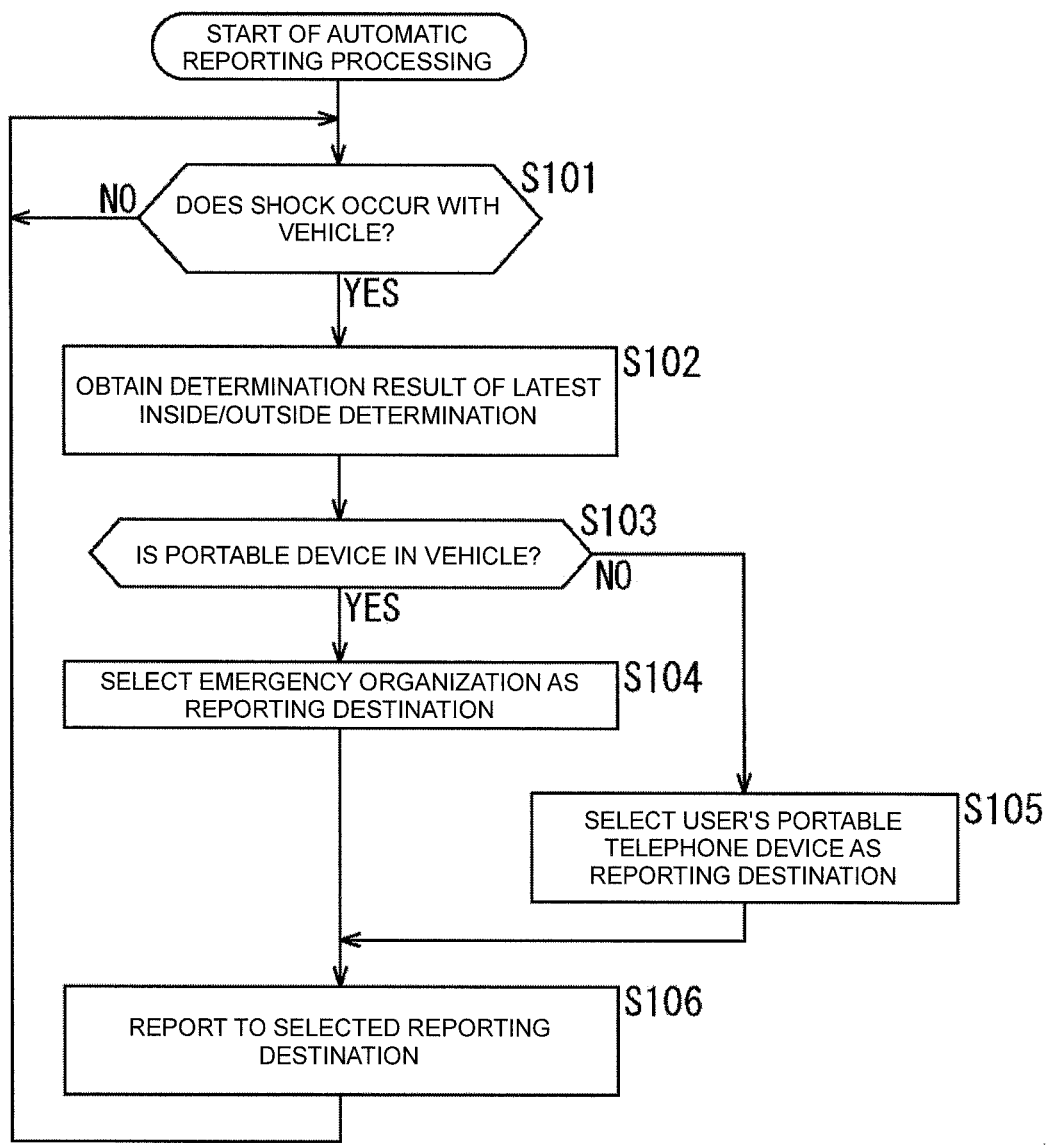
FIG. 7 is a flowchart for explaining automatic report processing that is performed by the onboard system of FIG. 2 according to one or more embodiments.

In step S105, the user's portable telephone device 14 is selected as the reporting destination, like the processing of step S5 of FIG. 7.

Thereafter, the processing proceeds to step S106.

In step S106, a report is sent to the selected reporting destination, like the processing of step S6 of FIG. 2.

Thereafter, back to step S101, and the processing in step S101 and subsequent steps is executed.

As described above, after the shock is detected with the vehicle, automatic report can be sent in a shorter time without performing the inside/outside determination. For example, even when the inside/outside determination and the communication with the portable device 12 cannot be normally executed due to the shock, automatic report can be sent by selecting an appropriate reporting destination.

(One or More Embodiments of Automatic Report Processing that is Performed by the Onboard System 101)

Subsequently, one or more embodiments of the automatic report processing executed by the onboard system 101 will be explained with reference to the flowchart of FIG. 8.

In steps S151 and S153, the same processing as steps S101 and S103 of FIG. 7 is executed. Therefore, when the shock is detected with the vehicle, a determination is made as to whether the portable device 12 is inside of the vehicle or not on the basis of the determination result of the latest inside/outside determination stored in the storage unit 122.

Figure 5:
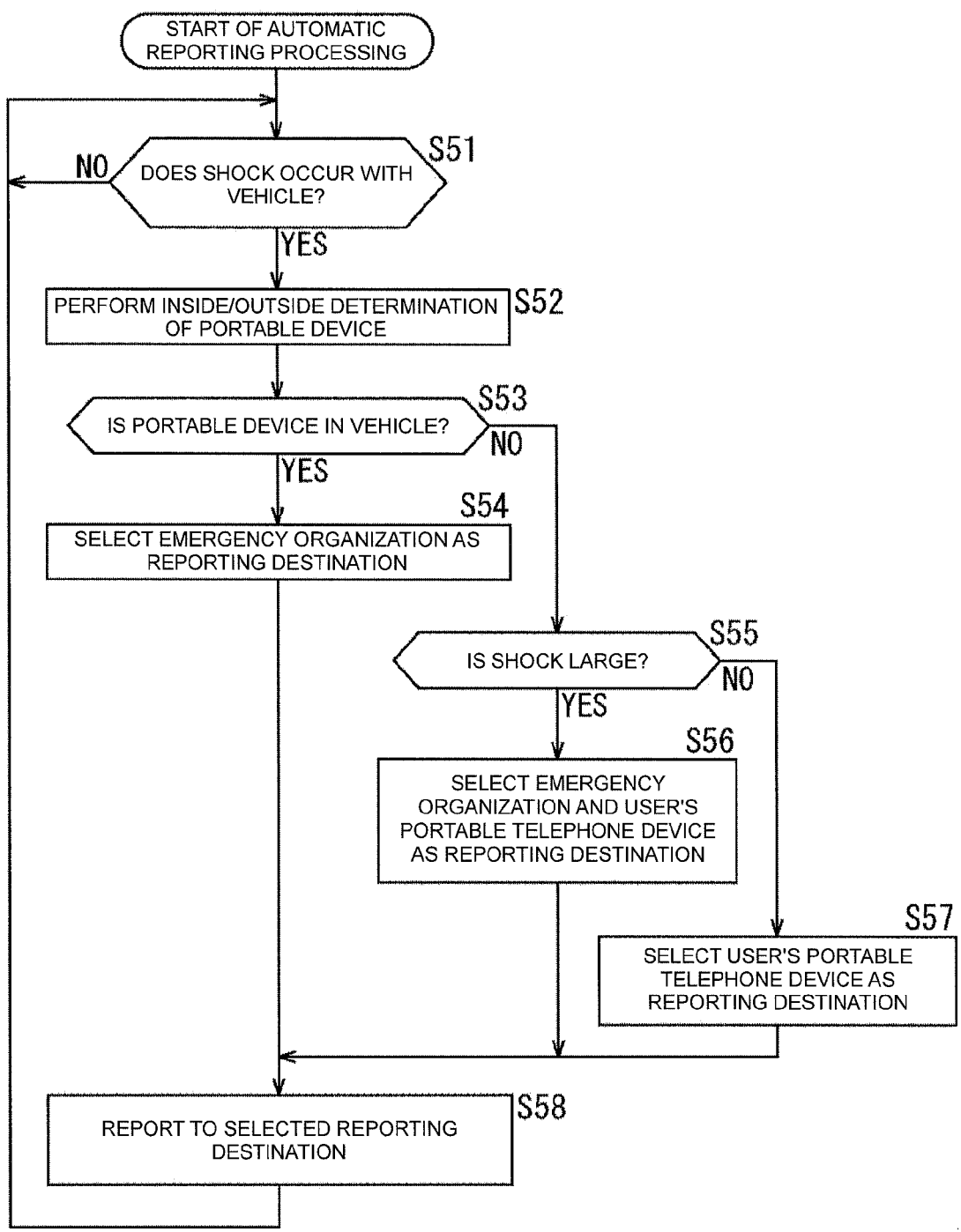
FIG. 5 is a flowchart for explaining automatic report processing that is performed by the onboard system of FIG. 1 according to one or more embodiments.

Then, in steps S154 to S158, the same processing as steps S54 to S58 of FIG. 5 is executed, and back to step S151, the processing in step S151 and subsequent steps is executed.

As described above, when the portable device 12 is outside of the vehicle, the reporting destination can be changed on the basis of the magnitude of the shock, like one or more embodiments of the automatic report processing that is performed by the onboard system 11 of FIG. 5. Like one or more embodiments of the automatic report processing that is performed by the onboard system 101 of FIG. 7, after the shock is detected with the vehicle, the automatic report can be sent in a shorter time, and even when the inside/outside determination and the communication with the portable device 12 due to the shock cannot be normally executed, automatic report can be sent by selecting the appropriate reporting destination.

A modification of one or more embodiments of the present invention explained above will be hereinafter explained.

In the above explanation, the method for detecting whether shock occurs with the vehicle or not and determining the magnitude of the shock on the basis of whether breaking of a window occurs or not and whether an airbag is activated or not has been shown, but other methods may be employed. For example, a sensor capable of detecting shock such as a shock sensor, a vibration sensor, and an acceleration sensor is used as the sensor 21, and the shock detection unit 31 may detect whether shock occurs with the vehicle and determine the magnitude of the shock on the basis of the strength of the shock detected by the sensor 21.

Figure 8:
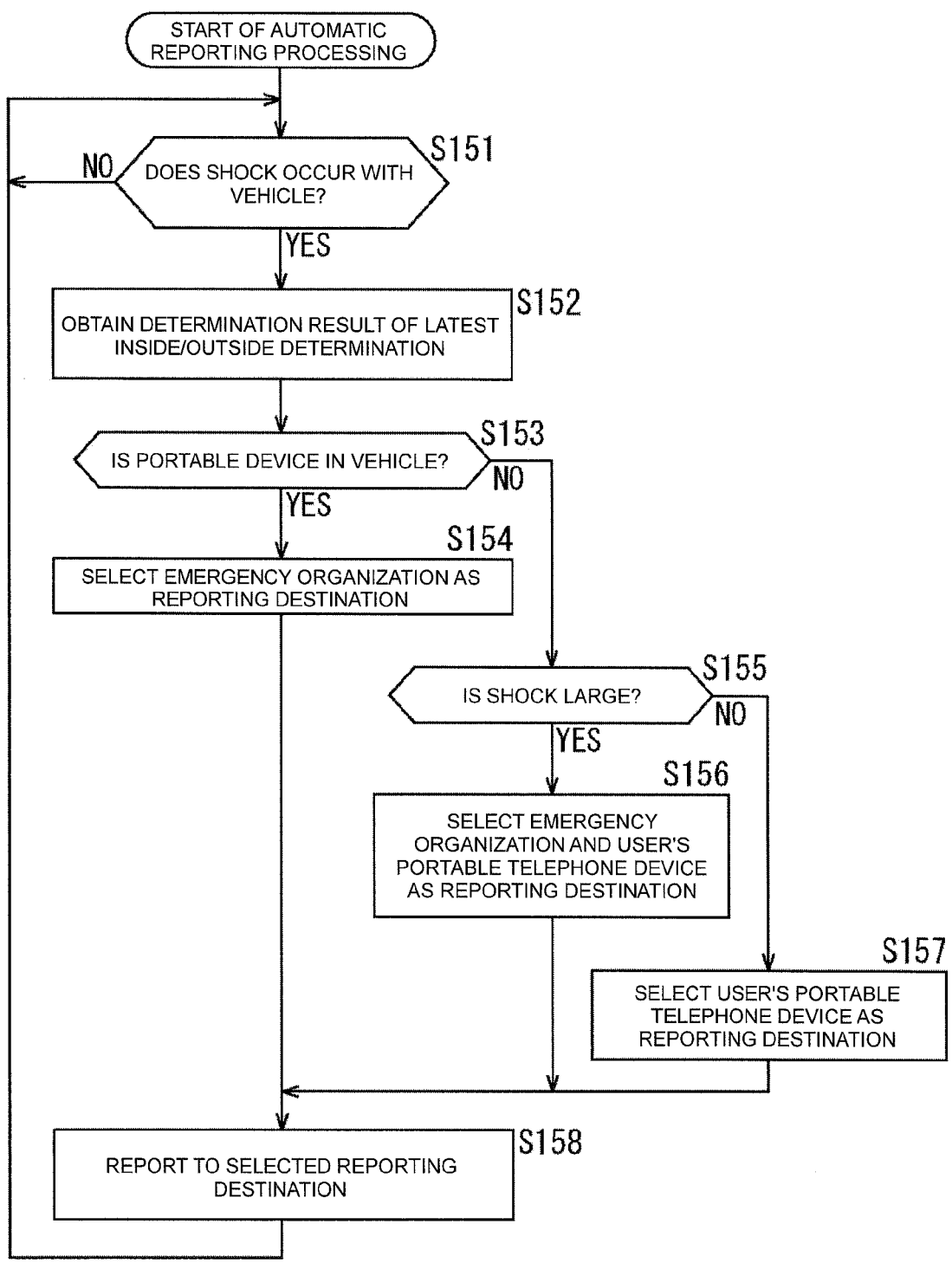
FIG. 8 is a flowchart for explaining automatic report processing that is performed by the onboard system of FIG. 2 according to one or more embodiments.

In this case, for example, in step S1 of FIG. 2, step S51 of FIG. 5, step S101 of FIG. 7, and step S151 of FIG. 8, the shock detection unit 31 determines whether shock occurs with the vehicle on the basis of whether the strength of the shock detected by the sensor 21 is equal to or more than a predetermined first threshold value or not. For example, in step S55 of FIG. 5 and step S155 of FIG. 8, the shock detection unit 31 determines whether the shock is large or not on the basis of whether the strength of the shock detected by the sensor 21 is equal to or more than a predetermined second threshold value (>first threshold value) or not.

For example, in the determination of the level of the magnitude of the shock, it may be divided into three or more steps instead of two steps, i.e., large and small, and options of reporting destinations may be increased so as to be able to select a reporting destination (or a combination of reporting destinations) which is different in accordance with each level.

Further, in a case where the sensor 21 is achieved with a sensor capable of detecting shock, for example, a sensor provided in the vehicle in advance that is used for determining whether an airbag is activated or not may be used.

The reporting destination to the user is not limited to the portable telephone device 14. For example, another communication terminal used as contacting means of the user such as the portable device 12 itself and a fixed-line telephone may be set as the reporting destination to the user.

Further, for example, not only shock with the vehicle may be detected, but also intrusion into the vehicle may be detected, and the detection result may be added to the selection condition of the reporting destination.

A method different from the method based on the state of the wireless communication explained above may be employed as the inside/outside determination of the portable device 12. For example, in a case where the portable device 12 is connected to a terminal in the vehicle (for example, a terminal of a cradle) and wired communication is performed, the inside/outside determination may be performed on the basis of the state of the wired communication.

For example, the inside/outside determination may be performed on the basis of whether the portable device 12 is at a predetermined position in the vehicle. For example, the inside/outside determination may be performed on the basis of a result of detection using a mechanical switch, e.g., whether a portable device 12 integrally made with a mechanical key is inserted into a key hole of a vehicle or not, or the portable device 12 is inserted into a predetermined slot in the vehicle. For example, the inside/outside determination may be performed on the basis of a result of detection as to whether the portable device 12 is electrically connected to, e.g., a charging terminal of a cradle in the vehicle.

For example, the inside/outside determination and the selection of the reporting destination may be performed further in view of the state of locking of the vehicle. For example, in a case where the determination result of the inside/outside determination is outside of the vehicle, and the vehicle is locked, then it is certain that the user is outside of the vehicle, and when the vehicle is not locked, the user may be in the vehicle. Therefore, on the basis of the locking state of the vehicle, the determination result of the inside/outside determination may be corrected, and the reporting destination may be changed. For example, when the determination result of the inside/outside determination is outside of the vehicle, and the vehicle is not locked, both reporting destinations which are a case where the user is inside of the vehicle and a case where the user is outside of the vehicle may be selected.

Further, for example, in step S3 of FIG. 2, step S53 of FIG. 5, step S103 of FIG. 7, or step S153 of FIG. 8, when the portable device 12 is determined to be outside of the vehicle, the reporting destination may not be selected. Then, in step S6 of FIG. 2, step S58 of FIG. 5, step S106 of FIG. 7, or step S158 of FIG. 8, when the reporting destination is not selected, a report may not be sent. Therefore, for example, when the user who has the portable device 12 is outside of the vehicle, the automatic report can be prevented from being performed.

[Example of Configuration of Computer]

The series of processing explained above may be executed either by hardware or software. When the series of processing is executed by software, programs constituting the software are installed to a computer. In this case, examples of computers include a computer incorporated into dedicated hardware and a general-purpose computer capable of executing various kinds of functions by installing various kinds of programs.

Examples of programs executed by the computer can be provided by recording the programs to a removable medium serving as a package medium and the like. The programs can be provided via a wired or wireless transmission medium such as a local area network, a CAN (Controller Area Network), the Internet, and a digital satellite broadcast.

Alternatively, the programs can be installed in advance to, for example, a ROM and a storage unit.

The programs to be executed by the computer may be programs for performing processes in chronological order in accordance with the sequence described in this specification, or may be programs for performing processes in parallel or performing a process when necessary, such as when there is a call.

In this specification, the system means a set of multiple constituent elements (such as apparatuses, modules (components), and the like), and it does not matter whether all of the constituent elements are in the same housing or not. In view of this, apparatuses that are housed in different housings and are connected to each other via a network form a system, and one apparatus having modules housed in one housing is also a system.

It should be noted that embodiments of the present technique are not limited to the above described embodiment, and various modifications may be made to it without deviating from the gist of the present technique.

Each step explained in the above flowchart may be executed by one apparatus, or may be executed by multiple apparatuses in a distributed manner.

Further, in a case where multiple pieces of processing are included in one step, the multiple pieces of processing included in the step may be executed by one apparatus, or may be executed by multiple apparatuses in a distributed manner.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An apparatus onboard a vehicle, the onboard apparatus configured to perform automatic reporting when an abnormality is detected with respect to the vehicle, the onboard apparatus comprising:
a shock detection unit configured to detect a shock to the vehicle as the abnormality;
an inside/outside determination unit configured to perform inside/outside determination as to whether a portable device for communicating with the vehicle is inside of the vehicle or outside of the vehicle;
a reporting destination selection unit configured to select a reporting destination on the basis of a determination result of the inside/outside determination; and a reporting unit configured to report first information based at least in part on the abnormality to the selected reporting destination in a case where a shock is detected to the vehicle.

2. The onboard apparatus according to claim 1, wherein when the determination result of the inside/outside determination is determined to be inside of the vehicle, the reporting destination selection unit selects a predetermined emergency organization as the reporting destination, and when the determination result of the inside/outside determination is determined to be outside of the vehicle, a user's communication terminal is selected as the reporting destination.

3. The onboard apparatus according to claim 2, wherein the shock detection unit further determines the magnitude of the shock to the vehicle, and
when the shock to the vehicle is determined to be large and the determination result of the inside/outside determination is determined to be outside of the vehicle, then the reporting destination selection unit selects not only the communication terminal but also the emergency organization as the reporting destination.

4. The onboard apparatus according to claim 3, wherein in a case where at least one of activation of an airbag of the vehicle and breaking of a window of the vehicle occurs, the shock detection unit determines that the shock occurs to the vehicle, and in a case where the airbag is activated, the shock detection unit determines that the shock to the vehicle is large, and in a case where the airbag is not activated, the shock detection unit determines that the shock to the vehicle is small.

5. The onboard apparatus according to claim 4, wherein in a case where the shock is detected to the vehicle, the inside/outside determination unit performs the inside/outside determination, and the reporting destination selection unit selects the reporting destination on the basis of the determination result of the inside/outside determination.

6. The onboard apparatus according to claim 4 further comprising:
a communication unit configured to perform wireless communication with the portable device; and
a storage unit configured to store the determination result of the inside/outside determination,
wherein the inside/outside determination unit performs the inside/outside determination on the basis of the state of the wireless communication that is performed with predetermined timing between the communication unit and the portable device, and stores the determination result of the inside/outside determination to the storage unit, and
the reporting destination selection unit selects the reporting destination on the basis of the determination result of the latest inside/outside determination stored in the storage unit when the shock is detected to the vehicle.

7. The onboard apparatus according to claim 3, wherein in a case where the shock is detected to the vehicle, the inside/outside determination unit performs the inside/outside determination, and the reporting destination selection unit selects the reporting destination on the basis of the determination result of the inside/outside determination.

8. The onboard apparatus according to claim 3 further comprising:
a communication unit configured to perform wireless communication with the portable device; and
a storage unit configured to store the determination result of the inside/outside determination,
wherein the inside/outside determination unit performs the inside/outside determination on the basis of the state of the wireless communication that is performed with predetermined timing between the communication unit and the portable device, and stores the determination result of the inside/outside determination to the storage unit, and
the reporting destination selection unit selects the reporting destination on the basis of the determination result of the latest inside/outside determination stored in the storage unit when the shock is detected to the vehicle.

9. The onboard apparatus according to claim 2, wherein in a case where the shock is detected to the vehicle, the inside/outside determination unit performs the inside/outside determination, and the reporting destination selection unit selects the reporting destination on the basis of the determination result of the inside/outside determination.

10. The onboard apparatus according to claim 2 further comprising:
a communication unit configured to perform wireless communication with the portable device; and
a storage unit configured to store the determination result of the inside/outside determination,
wherein the inside/outside determination unit performs the inside/outside determination on the basis of the state of the wireless communication that is performed with predetermined timing between the communication unit and the portable device, and stores the determination result of the inside/outside determination to the storage unit, and
the reporting destination selection unit selects the reporting destination on the basis of the determination result of the latest inside/outside determination stored in the storage unit when the shock is detected to the vehicle.

11. The onboard apparatus according to claim 1, wherein in a case where the determination result of the inside/outside determination is determined to be outside of the vehicle, the reporting destination selection unit does not select the reporting destination, and in a case where the shock is detected to the vehicle and the reporting destination is not selected, the reporting unit does not report.

12. The onboard apparatus according to claim 11, wherein in a case where the shock is detected to the vehicle, the inside/outside determination unit performs the inside/outside determination, and the reporting destination selection unit selects the reporting destination on the basis of the determination result of the inside/outside determination.

13. The onboard apparatus according to claim 11 further comprising:
a communication unit configured to perform wireless communication with the portable device; and
a storage unit configured to store the determination result of the inside/outside determination,
wherein the inside/outside determination unit performs the inside/outside determination on the basis of the state of the wireless communication that is performed with predetermined timing between the communication unit and the portable device, and stores the determination result of the inside/outside determination to the storage unit, and
the reporting destination selection unit selects the reporting destination on the basis of the determination result of the latest inside/outside determination stored in the storage unit when the shock is detected to the vehicle.

14. The onboard apparatus according to claim 1, wherein in a case where the shock is detected to the vehicle, the inside/outside determination unit performs the inside/outside determination, and the reporting destination selection unit selects the reporting destination on the basis of the determination result of the inside/outside determination.

15. The onboard apparatus according to claim 1 further comprising:
a communication unit configured to perform wireless communication with the portable device; and
a storage unit configured to store the determination result of the inside/outside determination,
wherein the inside/outside determination unit performs the inside/outside determination on the basis of the state of the wireless communication that is performed with predetermined timing between the communication unit and the portable device, and stores the determination result of the inside/outside determination to the storage unit, and
the reporting destination selection unit selects the reporting destination on the basis of the determination result of the latest inside/outside determination stored in the storage unit when the shock is detected to the vehicle.

16. A report control method used when an abnormality is detected with respect to a vehicle,
the report control method comprising:
a shock detection step for detecting a shock to the vehicle as the abnormality;
an inside/outside determination step for performing inside/outside determination as to whether a portable device for communicating with the vehicle is inside of the vehicle or outside of the vehicle;
a reporting destination selection step for selecting a reporting destination on the basis of a determination result of the inside/outside determination; and
a reporting step for reporting first information based at least in part on the abnormality to the selected reporting destination in a case where a shock is detected to the vehicle.

* * * * *